United States Patent
Abels et al.

(10) Patent No.: US 7,244,074 B2
(45) Date of Patent: Jul. 17, 2007

(54) BALL AND SOCKET JOINT WITH SEALING BELLOWS

(75) Inventors: Olaf Abels, Belm (DE); Jürgen Gräber, Stemwede-Dielingen (DE); Jochen Kruse, Osnabrück (DE); Volker Grube, Diepholz (DE); Dirk Lamla, Bramsche (DE); Manfred Bohne, Quernheim (DE); Melanie Enkler, Dinklage (DE); Metin Ersoy, Walluf (DE); Achim Möll, Rahden (DE); Thomas Rösler, Osnabrück (DE); Wolfgang Schmitt, Viernheim (DE)

(73) Assignee: ZF Lemförder Metallwaren AG (DE)

( * ) Notice: Subject to any disclaimer, the term of this patent is extended or adjusted under 35 U.S.C. 154(b) by 110 days.

(21) Appl. No.: 10/953,610

(22) Filed: Sep. 29, 2004

(65) Prior Publication Data
US 2005/0042022 A1    Feb. 24, 2005

Related U.S. Application Data

(63) Continuation of application No. PCT/DE03/02421, filed on Aug. 18, 2003.

(30) Foreign Application Priority Data
Aug. 22, 2002  (DE) ................. 102 39 266

(51) Int. Cl.
*F16B 7/10*     (2006.01)

(52) U.S. Cl. .......... 403/51; 403/50; 403/134; 277/634; 277/635

(58) Field of Classification Search ............ 277/634, 277/635, 551, 572, 577; 403/50, 51, 288, 403/134; 464/173, 175
See application file for complete search history.

(56) References Cited

U.S. PATENT DOCUMENTS

| 2,197,037 | A | * | 4/1940 | Gardner ................ 403/134 |
| 3,208,290 | A | | 9/1965 | Mathues et al. |
| 3,275,353 | A | * | 9/1966 | Turck et al. ............ 403/126 |
| 3,381,987 | A | * | 5/1968 | Husen ................ 403/51 |
| 4,650,362 | A | | 3/1987 | Kubo |
| 5,297,996 | A | * | 3/1994 | Draga ................ 464/175 |
| 6,350,075 | B1 | | 2/2002 | Abels |
| 2003/0156894 | A1 | * | 8/2003 | Suzuki et al. ........ 403/134 |
| 2003/0202842 | A1 | * | 10/2003 | Abels ................ 403/134 |

FOREIGN PATENT DOCUMENTS

| DE | 36 18 565 A1 | 12/1986 |
| DE | 198 43 063 C1 | 10/2000 |
| EP | 1 052 418 A2 | 11/2000 |
| WO | WO 00/55514 | 9/2000 |

* cited by examiner

*Primary Examiner*—Daniel P. Stodola
*Assistant Examiner*—Daniel J. Mills
(74) *Attorney, Agent, or Firm*—McGlew and Tuttle P.C

(57) ABSTRACT

A ball and socket joint (1) is provided, for example, for a chassis bearing, with a ball (2), a pivot (3) originating from the ball (2), a housing (4) accommodating the ball, and a sealing bellows (5), which extends between the housing (4) and the pivot (3) and has a housing-side opening (6) and a pivot-side opening (7). The sealing bellows (5) has a circumferential sealing lip (8) for sealing at the pivot-side opening (7). The ball and socket joint (1) has a first guide ring (9), which guides the sealing bellows (5). The first guide ring (9) is arranged at the pivot (3). An especially favorable functional separation is achieved as a result between the guiding function and the sealing function.

19 Claims, 1 Drawing Sheet

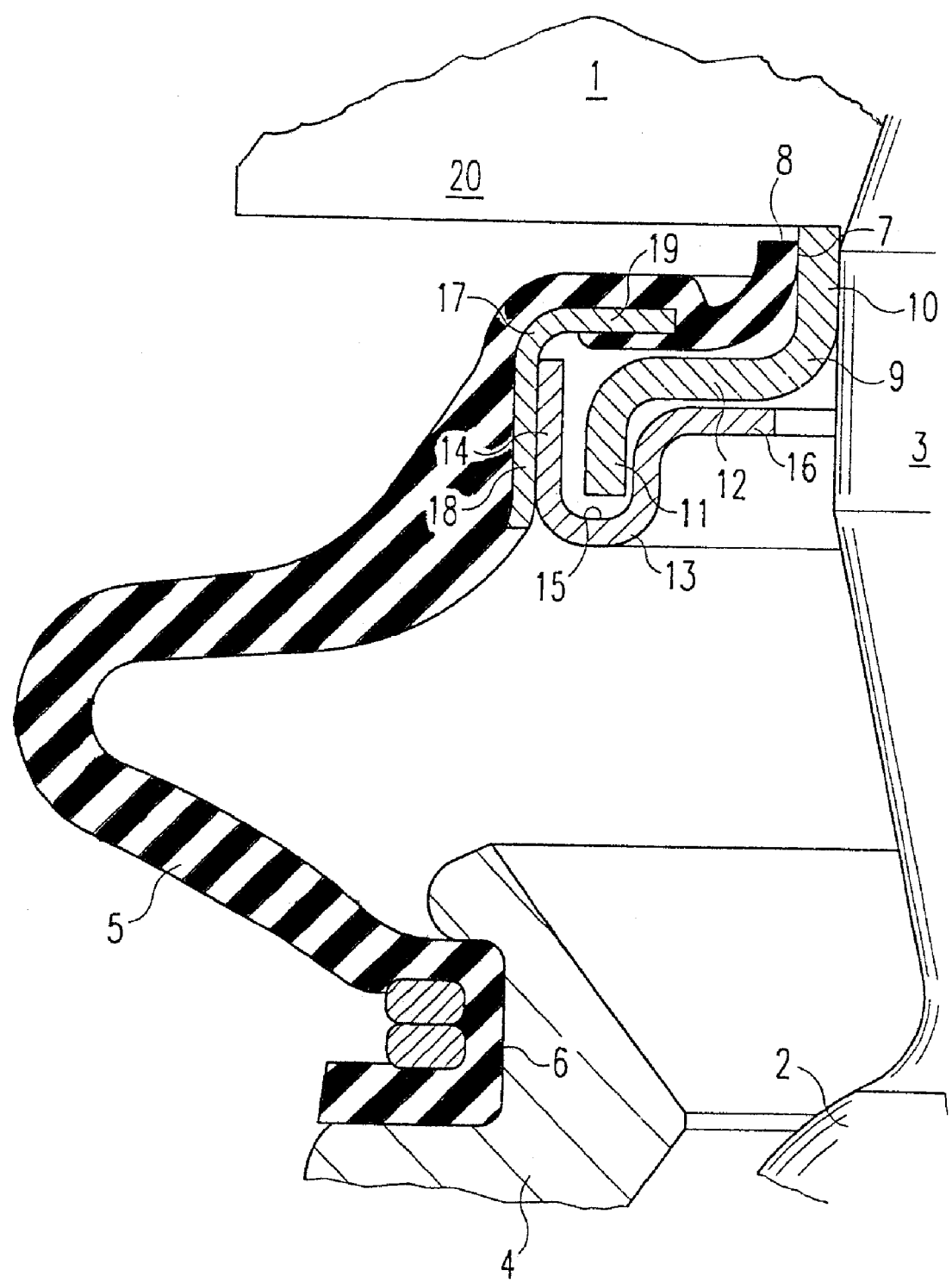

BALL AND SOCKET JOINT WITH SEALING BELLOWS

CROSS REFERENCE TO RELATED APPLICATION

This is a continuation of and claims the benefit (35 U.S.C. §120 and 365(c)) of copending International Application PCT/DE2003/002421 of Aug. 18, 2003, which designated inter alia the United States and which claims the priority of German Application DE 102 39 266.8 of Aug. 22, 2002. The entire contents of each application is hereby incorporated by reference in its entirety.

FIELD OF THE INVENTION

The present invention pertains to a ball and socket joint, especially a ball and socket joint of a chassis bearing, with a ball, a pivot originating from the ball, a housing accommodating the ball and a sealing bellows, which extends between the housing and the pivot and has a housing-side opening and a pivot-side opening, wherein the sealing bellows has a circumferential sealing lip for sealing at the pivot-side opening.

BACKGROUND OF THE INVENTION

A ball and socket joint of this class is known from DE 198 43 063 C1. Another ball and socket joint with a sealing bellows is known from DE 36 18 565 C2.

SUMMARY OF THE INVENTION

The general problem of ball and socket joints of this type is the sufficient sealing of the ball and socket joint against dust and dirt even during movements of the joint between the pivot and the housing accommodating the ball. Many suggestions have been made in the state of the art to solve this problem, including in the above-mentioned two documents.

The object of the present invention is to provide an improved ball and socket joint, in which the sealing bellows securely and reliably seals the ball and socket joint even during movements of the joint.

This object is accomplished by a ball and socket joint with a ball, a pivot originating from the ball, a housing accommodating the ball, and a sealing bellows, which extends between the housing and the pivot and has a housing-side opening and a pivot-side opening, wherein the sealing bellows has a circumferential sealing lip for sealing at the pivot-side opening, characterized in that a first guide ring, which guides the sealing bellows, is arranged at the pivot.

The ball and socket joint according to the present invention is characterized in that a first guide ring, which guides the sealing bellows, is arranged at the pivot. Due to the uncoupling between the sealing by means of the sealing lip and the guiding of the sealing bellows which occurs during the movements of the joint, an uncoupling is proposed according to the present invention, which is an essentially improved sealing method and apparatus as provided. Due to the separation of the functions between the sealing and guiding of the sealing bellows, the loads occurring due to the movement of the sealing bellows are no longer introduced into the sealing area or they are introduced to a very low extent only. The sealing action is substantially increased as a result.

In addition, the separation of the functions according to the present invention brings with it the advantage that the sealing can also be tested isolated from the angular deflection of the ball and socket joint. The reliability of operation of the sealing system is increased as well, because it can be used as a modular system. Furthermore, tests that had hitherto to be carried out at a very high expense for every individual sealing system are eliminated.

Furthermore, the separation according to the present invention between the guiding and the sealing creates the prerequisite for reducing the pressing pressures of the sealing bellows in the circumference as a whole, because the loads acting from the outside no longer need to be compensated in the sealing system. The sealing according to the present invention therefore has lower friction than comparable sealings according to the state of the art, which causes lower loads to be introduced into the jacket surface of the sealing bellows, which likewise leads to increased reliability of operation.

The above object is further accomplished by a ball and socket joint with a ball, a pivot originating from the ball, a housing accommodating the ball, and a sealing bellows, which extends between the housing and the pivot and has a housing-side opening and a pivot-side opening, wherein the sealing bellows has a circumferential sealing lip for sealing at the pivot-side opening, characterized in that a first guide ring, which guides the sealing bellows, is arranged at the pivot, further characterized in that the sealing lip is in contact with the first guide ring.

The above object is further accomplished by a ball and socket joint with a ball, a pivot originating from the ball, a housing accommodating the ball, and a sealing bellows, which extends between the housing and the pivot and has a housing-side opening and a pivot-side opening, wherein the sealing bellows has a circumferential sealing lip for sealing at the pivot-side opening, characterized in that a first guide ring, which guides the sealing bellows, is arranged at the pivot, further characterized in that the sealing bellows has a second guide ring cooperating with the first guide ring for guiding the sealing bellows.

The above object is further accomplished by a ball and socket joint with a ball, a pivot originating from the ball, a housing accommodating the ball, and a sealing bellows, which extends between the housing and the pivot and has a housing-side opening and a pivot-side opening, wherein the sealing bellows has a circumferential sealing lip for sealing at the pivot-side opening, characterized in that a first guide ring, which guides the sealing bellows, is arranged at the pivot, further characterized in that the first guide ring has a first axial section, which is arranged at the pivot and with which the sealing lip is in contact, and a second axial section, by which the sealing bellows is guided.

The above object is further accomplished by a ball and socket joint with a ball, a pivot originating from the ball, a housing accommodating the ball, and a sealing bellows, which extends between the housing and the pivot and has a housing-side opening and a pivot-side opening, wherein the sealing bellows has a circumferential sealing lip for sealing at the pivot-side opening, characterized in that a first guide ring, which guides the sealing bellows, is arranged at the pivot, further characterized in that the second axial section of the first guide ring engages a groove of the second guide ring.

The above object is further accomplished by a ball and socket joint with a ball, a pivot originating from the ball, a housing accommodating the ball, and a sealing bellows, which extends between the housing and the pivot and has a housing-side opening and a pivot-side opening, wherein the sealing bellows has a circumferential sealing lip for sealing at the pivot-side opening, characterized in that a first guide ring, which guides the sealing bellows, is arranged at the pivot, further characterized in that the sealing bellows has a reinforcing ring, at which the second guide ring is supported.

The above object is further accomplished by a ball and socket joint with a ball, a pivot originating from the ball, a housing accommodating the ball, and a sealing bellows, which extends between the housing and the pivot and has a housing-side opening and a pivot-side opening, wherein the sealing bellows has a circumferential sealing lip for sealing at the pivot-side opening, characterized in that a first guide ring, which guides the sealing bellows, is arranged at the pivot, characterized in that the reinforcing ring has an L-shaped design and has an axial leg, at which the second guide ring is supported, and a radial leg, which points in the direction of the pivot.

The sealing lip is advantageously directly in contact with the first guide ring. Since the first guide ring is arranged stationarily at the pivot, e.g., by pressing, sealing is made possible here by the sealing lip being in contact with the first guide ring. The sealing bellows advantageously has a second guide ring, which cooperates with the first guide ring to guide the sealing bellows, i.e., to hold the sealing bellows at the pivot even during movements of the joint. The first and second guide rings guarantee the guiding of the sealing bellows such that the sealing lip is sealingly in contact with the first guide ring during each movement of the ball and socket joint.

The first guide ring advantageously comprises a first axial section, which is arranged at the shaft (pivot), and with which the sealing lip is in contact, and a second axial section, which guides the sealing bellows. The second axial section of the first guide ring advantageously engages a groove of the second guide ring. In particular, the radial guiding of the sealing bellows is guaranteed hereby at the shaft. It shall be pointed out that the terms "axial" and "radial" pertain to the normally cylindrical pivot of the ball and socket joint, more precisely, to the longitudinal axis of the pivot. The feature "axial" pertains here to directions that are parallel to this longitudinal axis, and the feature "radial" pertains to directions that extend at right angles, i.e., in the radial direction to the longitudinal direction of the pivot.

The sealing bellows advantageously has a reinforcing ring, at which the second guide ring is supported. This reinforcing ring is advantageously L-shaped and has an axial leg, at which the second guide ring is supported, and a radial leg, which points in the direction of the pivot. The housing-side part of the sealing bellows is reinforced and stiffened by the reinforcing ring in order to make possible the sealing contact of the sealing lip with the first guide ring, on the one hand, and the effective engagement of the first and second guide rings, on the other hand.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

FIG. 1 is a sectional view of a part of a ball and socket joint, with a partial view of the ball, a partial view of the pivot as well as a partial view of the housing accommodating the ball.

DESCRIPTION OF THE PREFERRED EMBODIMENT

FIG. 1 is a sectional view of a part of a ball and socket joint 1, comprising a ball 2 (partially shown), a pivot 3 (partially shown) as well as a housing 4 (partially shown) accommodating the ball. The design of the ball 2, the pivot 3 and the housing 4 corresponds to the usual design in a ball and socket joint. The ball and socket joint 1 according to the present invention is especially suitable for use as a ball and socket joint in a chassis bearing in a vehicle, but it may also be used in other areas.

A sealing bellows 5, which has a housing-side opening 6 and a pivot-side opening 7, extends between the pivot 3 and the housing 4. It shall be mentioned here for clarification that the partial sectional view shown in the figure is rotationally symmetrical around the longitudinal axis of the pivot 3. The pivot 3 is usually cylindrical and the sealing bellows 5 extends, e.g., in a disk-shaped manner around the pivot 3 and partially around the housing 4. The sealing bellows 5 is fastened to the housing 4 in the usual manner by means of straining rings or the like. In its middle area, i.e., between the housing-side opening 6 and the pivot-side opening 7, the sealing bellows bulges out, so that a sufficient amount of material is also present during movements of the joint to ensure the sealing function.

A first guide ring 9 is arranged, e.g., pressed on, at the pivot 7, in the area of the pivot-side opening 7 of the sealing bellows 5, and is therefore fixed statically firmly and sealingly thereon. This first guide ring 9 comprises a first axial section 10, which forms a sealing and rigid connection with the pivot 3. Furthermore, the first guide ring 9 comprises a radial section 12, which extends away from the pivot 3 and opens into a second axial section 11, which extends in the direction of the housing-side opening 6.

The sealing bellows 5 ends at its pivot-side opening 7 in a sealing lip 8, which is sealingly in contact with the first axial section 10 of the first guide ring 9. Furthermore, an L-shaped reinforcing ring 17, which has an axial leg 18 and a radial leg 19, is provided in the pivot-side area of the sealing bellows 5. The radial leg 19 faces the pivot, and the axial leg 18 extends on the side of the radial leg 19 facing away from the pivot 3 in the direction of the housing 4. The reinforcing ring 17 reinforces and stiffens the pivot-side area of the sealing bellows 5. Since the radial leg 19 extends in the direction of the sealing lip 8 and almost up to same, reliable and sealing contact is guaranteed between the sealing lip 8 and the first axial section 10 of the first guide ring 9.

A second guide ring 13 is arranged, e.g., pressed on, on the inside of the axial leg 18 of the reinforcing ring 17 (on the side facing the pivot 3), and is therefore fixed statically and firmly at same. The second guide ring 13 has an axial section 14, which establishes the connection with the axial leg 18 of the reinforcing ring 17. The axial section 14 is joined downwardly (in the direction of the housing 4) by a groove 15, which ends in a radial section 16 in the direction of the pivot 3. The second axial section 11 of the first guide ring 9 engages this groove 15.

The intermediate space between the radial leg 19 of the reinforcing ring 17 or the part of the sealing bellows 5 ending in the sealing lip 8 as well as the radial section 16 of the second reinforcing ring 13 is dimensioned such that the radial section 12 of the first guide ring 9 is guided with a slight clearance in the axial direction. Guiding of the sealing bellows 5 in the axial direction is brought about hereby. The radial guiding of the sealing bellows is brought about by the cooperation of the second axial section 11 of the first guide ring 9 and the groove 15 of the second guide ring 13.

The width of the groove 15 is dimensioned precisely such that the axial section 11 is held in it with a slight clearance, so that sufficient radial guiding is guaranteed. The radial and axial guiding of the sealing bellows 5 in relation to the pivot 3 is therefore brought about by the cooperation of the first guide ring 9 and the second guide ring 13.

Furthermore, this geometry enables the sealing lip 8 to be always reliably and sealingly in contact with the first axial leg 10 of the first guide ring 9 during any movement of the ball and socket joint, and the ball and socket joint is thus sealed. The first guide ring 9, the second guide ring 13 and the reinforcing ring 17 may be made, for example, of a suitable metal or plastic. The intermediate space between the first guide ring 9 and the second guide ring 13 may be filled with grease in order to reduce the friction and to achieve better sealing. In addition, the intermediate space between the first guide ring 9 and the upper part of the sealing bellows 5 may be filled with grease as well.

It can be recognized in the figure that the upper end of the first axial section 10 of the first guide ring 9 is supported at an additional part 20. This part 20 is a holder for a lever 20, for example, in a chassis bearing, which is arranged on a conical section of the pivot 3 and is, e.g., screwed thereto. For example, the first guide ring 9 is attached over the conical section of the pivot 3 during the final assembly and then pushed gap-free and sealingly into the final position during the final assembly only by placing and screwing on the holder for the lever 20 with the joint pivot 3, as a result of which the upper area of the sealing bellows 5 is securely fastened to the pivot with the sealing lip 8 and the second guide ring 13 via the first guide ring 9.

While a specific embodiment of the invention has been shown and described in detail to illustrate the application of the principles of the invention, it will be understood that the invention may be embodied otherwise without departing from such principles.

APPENDIX

List of Reference Numbers:

| | |
|---|---|
| 1 | Ball and socket joint |
| 2 | Ball (shown only partially) |
| 3 | Pivot (shown only partially) |
| 4 | Housing (shown only partially) |
| 5 | Sealing bellows |
| 6 | Housing-side opening |
| 7 | Pivot-side opening |
| 8 | Sealing lip |
| 9 | First guide ring |
| 10 | First axial section |
| 11 | Second axial section |
| 12 | Radial section |
| 13 | Second guide ring |
| 14 | Axial section |
| 15 | Groove |
| 16 | Radial section |
| 17 | Reinforcing ring |
| 18 | Axial leg |
| 19 | Radial leg |
| 20 | Holder for lever |

What is claimed is:

1. A ball and socket joint comprising:
   a ball;
   a pivot originating from said ball;
   a housing accommodating said ball;
   a sealing bellows, which extends between said housing and said pivot and has a housing-side opening and a pivot-side opening, wherein said sealing bellows has a circumferential sealing lip for sealing at said pivot-side opening; and,
   a first guide ring, which guides said sealing bellows, said first guide ring being arranged at said pivot wherein said first guide ring includes a first axial section, which is arranged fixed statically to said pivot and with which said sealing lip is in contact, and a second axial section, by which said sealing bellows is guided, said second axial section being spaced a greater radial distance from said pivot than said first axial section, wherein said sealing bellows has a second guide ring cooperating with said first guide ring for guiding said sealing bellows relative to said pivot, said second axial section of said first guide ring extends into an axial groove of said second guide ring.

2. A ball and socket joint in accordance with claim 1, wherein said sealing bellows has a reinforcing ring, at which said second guide ring is supported.

3. A ball and socket joint in accordance with claim 2, wherein said reinforcing ring has a cross-sectional L-shaped design and has an axial leg, at which said second guide ring is supported, and a radial leg, which extends toward said pivot.

4. A ball and socket joint in accordance with claim 1, wherein said first guide ring includes a radial section arranged between said first axial section and said second axial section.

5. A ball and socket joint in accordance with claim 4, wherein said second guide ring includes an axial groove and said second axial section of said first guide ring extends into said axial groove.

6. A ball and socket joint in accordance with claim 5, wherein said first axial section and said second axial section extend from the radial section of said first guide ring in two opposite directions.

7. A ball and socket joint in accordance with claim 6, wherein:
   said second guide ring includes an axial section and a radial section;
   said axial groove is arranged between said axial section of said second guide ring and said radial section of said second guide ring.

8. A ball and socket joint in accordance with claim 7, wherein:
   said axial section of said second guide ring is spaced a greater radial distance from said pivot than said radial section of said second guide ring.

9. A ball and socket joint in accordance with claim 8, wherein:
   said sealing bellows has a reinforcing ring including an axial leg and a radial leg;
   said second guide ring is supported at said axial leg.

10. A ball and socket joint in accordance with claim 9, wherein:
    said axial section of said second guide ring is fixed statically to an inside of said axial leg.

11. A ball and socket joint in accordance with claim 7, wherein:
    said axial groove is closed on a side facing said housing; and
    said axial groove has a groove opening on a side facing away from said housing; and
    said axial groove is laterally limited by said axial section of said second guide ring and by a second axial section of said second guide ring; and said axial section of the second guide ring has a greater radial distance to said pivot than said second axial section of said second guide ring.

12. A ball and socket joint in accordance with claim 11, wherein said second axial section of said first guide ring extends into said groove opening of said axial groove.

13. A ball and socket joint comprising:
   a ball;
   a pivot originating from said ball;
   a housing accommodating said ball;
   a sealing bellows, which extends between said housing and said pivot and has a housing-side opening and a pivot-side opening, wherein said sealing bellows has a circumferential sealing lip for sealing at said pivot-side opening; and
   a first guide ring, which guides said sealing bellows, said first guide ring including a first axial section fixed to said pivot for movement therewith, said first guide ring defining a sealing surface with which said sealing lip is in contact, a radial section extending away from said pivot and a second axial section extending axially from said radial section at a location spaced from said first axial section, said second axial section being spaced a greater radial distance from said pivot than said first axial section; and
   a second guide ring connected to said sealing bellows and cooperating with said first guide ring for guiding said sealing bellows, said second guide ring including a section fixed to said sealing bellows and a groove section defining a groove having an axial groove extent, said second axial section of said first guide ring extending into said groove.

14. A ball and socket joint in accordance with claim 13, wherein said first axial section of said first guide ring and said second axial section of said first guide ring extend from the radial section of said first guide ring in two opposite directions.

15. A ball and socket joint in accordance with claim 14, wherein:
   said section of said second slide ring fixed to said sealing bellows is an axial section and said second slide ring also includes a radial section;
   said groove section is arranged between said axial section of said second guide ring and said radial section of said second guide ring.

16. A ball and socket joint in accordance with claim 15, wherein:
   said axial section of said second guide ring is spaced a greater radial distance from said pivot than said radial section of said second guide ring.

17. A ball and socket joint in accordance with claim 16, wherein:
   said sealing bellows has a reinforcing ring including an axial leg and a radial leg;
   said second guide ring is connected to said bellows at said axial leg with said axial section of said second guide ring fixed to an inside of said axial leg.

18. A ball and socket joint in accordance with claim 15, wherein:
   said groove section defines said groove with a closed side facing said housing and a groove opening on a side facing away from said housing; and
   said groove is laterally limited by said axial section of said second guide ring and by a second axial section of said second guide ring; and
   said axial section of the second guide ring has a greater radial distance to said pivot than said second axial section of said second guide ring.

19. A ball and socket joint in accordance with claim 18, wherein said second axial section of said first guide ring extends into said groove opening of said groove.

* * * * *